(12) United States Patent
Martucci et al.

(10) Patent No.: US 7,003,170 B1
(45) Date of Patent: Feb. 21, 2006

(54) METHODS AND APPARATUS FOR IMPROVING QUALITY OF BLOCK-TRANSFORM CODED IMAGES

(75) Inventors: Stephen A. Martucci, Kendall Park, NJ (US); John H. Elton, Atlanta, GA (US)

(73) Assignee: Pegasus Imaging Corporation, Tampa, FL (US)

( * ) Notice: Subject to any disclaimer, the term of this patent is extended or adjusted under 35 U.S.C. 154(b) by 546 days.

(21) Appl. No.: 10/247,999

(22) Filed: Sep. 20, 2002

(51) Int. Cl.
*G06K 9/46* (2006.01)
*G06K 9/40* (2006.01)

(52) U.S. Cl. ........................... 382/250; 382/275
(58) Field of Classification Search ............. 382/199, 382/219, 220, 232, 233, 238, 240, 248, 250, 382/254, 268, 275; 375/240.16, 240.18, 375/240.2, 240.24; 358/432, 433; 348/420
See application file for complete search history.

(56) References Cited

U.S. PATENT DOCUMENTS

| | | | | |
|---|---|---|---|---|
| 5,454,051 A | * | 9/1995 | Smith | 382/233 |
| 5,737,451 A | | 4/1998 | Gandhi et al. | |
| 5,937,101 A | * | 8/1999 | Jeon et al. | 382/268 |
| 6,028,967 A | * | 2/2000 | Kim et al. | 382/268 |
| 6,188,728 B1 | * | 2/2001 | Hurst | 375/240.16 |
| 6,317,522 B1 | * | 11/2001 | Rackett | 382/268 |
| 6,427,031 B1 | | 7/2002 | Price | |
| 6,529,638 B1 | * | 3/2003 | Westerman | 382/275 |
| 6,813,387 B1 | * | 11/2004 | Berkner et al. | 382/240 |
| 2003/0138150 A1 | * | 7/2003 | Srinivasan | 382/238 |
| 2005/0058354 A1 | * | 3/2005 | Weintraub et al. | 382/233 |

OTHER PUBLICATIONS

S. A. Martucci, "A New Approach for Reducing Blockiness in DCT Image Coders", Scitex Digital Video, IEEE, 1998, pp. 2549-2552.
G. A. Triantafyllidis, D. Tzovaras and M. G. Strintzis, "Blocking Artifact Reduction in Frequency Domain", Informatics and Telematics Institute, IEEE, 2001, pp. 269-272.

* cited by examiner

*Primary Examiner*—Andrew W. Johns
*Assistant Examiner*—Amir Alavi
(74) *Attorney, Agent, or Firm*—Straub & Pokotylo; Michael P. Straub

(57) ABSTRACT

Block-based image processing methods and apparatus that provide a reduction in block-transform image coding artifacts are described. In various embodiments, the invention is directly incorporated into a decoding process. In such embodiments, transform coefficients are modified in simple but particularly effective ways that reduce or eliminate many of the artifacts that were caused by the quantization of the transform coefficients during encoding and/or by independent block processing during encoding. In other embodiments, the invention is used on an image that has already been decoded. In such embodiments image data values are directly modified in a block-based fashion or a forward block transform is applied and then the methods of the invention for processing transform coefficient blocks are used, followed by an inverse transform operation to generate pixel values from the resulting processed transform coefficient blocks.

19 Claims, 11 Drawing Sheets

METHODS AND APPARATUS FOR IMPROVING QUALITY OF BLOCK-TRANSFORM CODED IMAGES

FIELD OF THE INVENTION

The present invention relates to image processing methods and, more particularly, to methods and apparatus for reducing the blockiness of previously encoded images.

BACKGROUND OF THE INVENTION

The capture, storage, and transmission of digital images and digital video have become widespread. Compression has made this possible by significantly reducing the number of bits required to represent an image without seriously degrading it. But there still remains a need for greater compression and better image quality. The digital image and video compression standards, such as JPEG, MPEG, and H.263, are powerful tools that try to meet the need for compression. But there is a limit to how much compression is possible without artifacts becoming too annoying. Even at low levels of compression, when artifacts and distortions may not be visible to the human eye, they are still present in the reconstructed image and can cause problems when further processing is attempted.

Transforms, such as the discrete cosine transform (DCT), are a key part of many of today's image and video compression algorithms. At low levels of compression, the reconstructed images and frames of video are visually indistinguishable from the originals. However, as the degree of compression increases, the visibility of annoying artifacts and distortions increases. These artifacts limit the size to which an image or video can be compressed and still be pleasing to look at.

There exists a great need for ways to reduce or remove the coding artifacts and improve the quality of block transform coded images, particularly those compressed using the block DCT. There are methods for addressing these problems that are known in the art, but they have their shortcomings. New and better ways to effectively and efficiently reduce block-coding artifacts are required.

The term image is understood to mean a still image, a frame or field of video, a graphics image, or any other two-dimensional set of visual data. Grey-scale images are typically represented as one value for each pixel of a two-dimensional array of pixels. Color images are typically represented as a triplet of values at each pixel; for example, there is one value for each of the color components red, green, and blue. An alternative representation is a luminance component, denoted Y, and two color-difference components, such as $C_b$ and $C_r$.

In a typical block DCT (discrete cosine transform) compression algorithm, the input image is partitioned into contiguous nonoverlapping blocks of size $N_1 \times N_2$ pixels, where each of $N_1$ and $N_2$ are typically equal to 8. FIG. 1 illustrates an image partitioned into 16 nonoverlapping blocks in such a manner. Each block is transformed using the forward two-dimensional orthogonal type-2 even discrete cosine transform (DCT-2), hereafter referred to simply as the DCT, whose transform coefficients $X_{II}(m_1,m_2)$ are given by the expression:

The multiplier $k(\mu)$ is $1/\sqrt{2}$ when $\mu=0$, and is 1 when $\mu=1, 2, \ldots, N_1-1$ or $\mu=1, 2, \ldots, N_2-1$. For a given block, the input data $x(n_1,n_2)$, $n_1=0, 1, \ldots, N_1-1$, $n_2=0, 1, \ldots, N_2-1$, are transformed into coefficients $X_{II}(m_1,m_2)$, $m_1=0, 1, \ldots, N_1-1$, $m_2=0, 1, \ldots, N_2-1$, where $N_1$ and $N_2$ are the dimensions of the block. Because this is an orthogonal transform, the equation for the inverse transform is easily derived from the equation for the forward transform.

The coefficients $X_{II}(m_1,m_2)$ are quantized using an operation such as:

$$X_q(m_1,m_2) = \text{round}(X_{II}(m_1,m_2)/Q(m_1,m_2))$$

where the $Q(m_1,m_2)$, $m_1=0, 1, \ldots, N_1-1$, $m_2=0, 1, \ldots, N_2-1$, constitute a quantization matrix whose elements define the size of the quantization interval for each coefficient and round(•) is a function that rounds its argument to the nearest integer. The operation of quantization replaces each coefficient, e.g., $X_{II}(m_1,m_2)$, by a quantization level $X_q(m_1,m_2)$. A quantization level is a value that represents the quantization interval into which the original coefficient falls.

Quantization is an irreversible operation and it is here that the losses of lossy compression occur. These quantization losses are responsible for many of the artifacts that will appear in the decoded image. The other cause of artifacts is the independent processing of the nonoverlapping blocks of the image. Because no data is shared between blocks that are quantized and coded independent of one another, there can arise significant disparities between decoded blocks and these disparities may be perceived as annoying blockiness.

While blockiness problems occur as a result of DCT coding in the above-described manner, similar blockiness problems arise when other transforms, e.g., DFT (discrete Fourier transform) or DST (discrete sine transform) are used to encode image data.

As part of many image encoding processes, quantization is followed by entropy coding, a lossless process that removes redundancy. The entropy-coded bits for the luminance and color components of a color image, for example, are then packaged together with some informational overhead to yield a compliant compressed image.

Decompression is normally achieved by performing the inverse of the compression operations in the reverse order. The entropy-coded bits are entropy decoded to recover the quantized coefficients. These coefficients are dequantized using an operation such as:

$$X_d(m_1,m_2) = X_q(m_1, m_2) Q(m_1, m_2)$$

where the $Q(m_1,m_2)$, $m_1=0, 1, \ldots, N_1-1$, $m_2=0, 1, \ldots, N_2-1$, is the same $Q(m_1,m_2)$ that was used for compression. The net effect of quantization and dequantization according to the above equations is to replace each original DCT coefficient with the value at the midpoint of its quantization interval. The dequantized DCT coefficients are transformed back to image data using the inverse DCT.

Also known in the art is the two-dimensional orthogonal type-1 even discrete cosine transform (DCT-1), whose transform coefficients $X(m_1,m_2)$ are given by the expression:

$$X_{II}(m_1, m_2) = \frac{2}{\sqrt{N_1 N_2}} k(m_1) k(m_2) \sum_{n_1=0}^{N_1-1} \sum_{n_2=0}^{N_2-1} x(n_1, n_2) \cos\left(\frac{\pi m_1 \left(n_1 + \frac{1}{2}\right)}{N_1}\right) \cos\left(\frac{\pi m_2 \left(n_2 + \frac{1}{2}\right)}{N_2}\right)$$

$$X_I(m_1, m_2) = \frac{2}{\sqrt{N_1 N_2}} k(m_1)k(m_2) \sum_{n_1=0}^{N_1} \sum_{n_2=0}^{N_2} k(n_1)k(n_2)x(n_1, n_2)\cos\left(\frac{\pi m_1 n_1}{N_1}\right)\cos\left(\frac{\pi m_2 n_2}{N_2}\right)$$

The multiplier $k(\mu)$ is $1/\sqrt{2}$ when $\mu=0$ or $\mu=N_1$ or $\mu=N_2$, and is 1 when $\mu=1, 2, \ldots, N_1-1$ or $\mu=1, 2, \ldots, N_2-1$. For a given block, the input data $x(n_1,n_2)$, $n_1=0, 1, \ldots, N_1$, $n_2=0, 1, \ldots, N_2$, are transformed into coefficients $X_1(m_1,m_2)$, $m_1=0, 1, \ldots, N_1$, $m_2=0, 1, \ldots, N_2$, where $N_1$ and $N_2$ are the dimensions of the block. The DCT-1 is an orthogonal transform with the additional property that the same equation can be used to compute both forward and inverse transforms. The DCT-1 operates on a block of size $(N_1+1) \times (N_2+1)$. The DCT-1 is not used in typical block-DCT compression, but will be used in some embodiments of the present invention.

One known approach to improving the quality of compressed images is to apply some type of filter after decompression. A lowpass filter can be used to reduce the visibility of blockiness but it also smoothes details of the image and makes the image appear less sharp. The filtering can be restricted to operate only where blockiness occurs at the block boundaries, but doing so can add significant complexity to the implementation and will still cause unwanted smoothing of image detail that is at the block boundaries. The filtering can be done conditionally, but that adds complexity and reduces the blockiness removal effectiveness. Image quality improvements have been achieved with iterative restoration and other linear and nonlinear post-processing techniques, but these methods all add substantial complexity and latency that reduce their usefulness.

Another approach to reducing compression artifacts is to modify the encoder, such as by using overlapping blocks instead of the nonoverlapping blocks as defined in the standards. This approach has the disadvantages of increasing the complexity of the encoder and increasing the amount of data to be compressed. Another shortcoming is that the compressed image would no longer be compliant with the standard based on nonoverlapping blocks. As a result, a standard decoder would not be able to decode the encoded image. Instead, a more complex special purpose decoder would be required.

There are some approaches that can be integrated into the decoding process to reduce artifacts. One known noteworthy approach modifies the quantized DC coefficient, i.e., the coefficient at indices $(m_1,m_2)=(0,0)$ of each DCT block. When using the known technique, each quantized DC coefficient is replaced with the average of itself and the quantized DC coefficients of the eight adjacent blocks. The modified coefficient is then clamped to stay within the quantization interval of the original value. FIG. 2 illustrates this processing. The processing shown in FIG. 2 reduces DC block artifacts but leaves many others unimproved.

The known method 200 shown in FIG. 2 begins in step 210 wherein JPEG-compressed encoded image data 260, e.g., blocks of entropy encoded quantized DCT coefficients, begins to be processed. In step 220 entropy decoding is performed on the JPEG compressed encoded image data 260 to yield 8×8 blocks of quantized DCT coefficients. Next, in step 230 each quantized DC coefficient in a block of quantized coefficients is replaced with the mean of itself and quantized DC coefficients of eight adjacent blocks. In step 240 each replaced quantized coefficient is clamped to the quantization interval of the original DC coefficient that was replaced by the mean value. Processing ends in step 250 with blocks of quantized DCT coefficients, including the clamped mean DC coefficient values, being available for further processing.

There is another approach, included in an informative annex of the JPEG image compression standard, that operates on the first five quantized AC coefficients, in zigzag scan order, of each block. A prediction is computed for each of these coefficients as a function of the DC coefficients of this block and the eight neighboring blocks. The values used for prediction are DC values that have been recovered directly from the data stream or they may be processed DC values, an example of such processing being the above mentioned filtering. In such an implementation the AC coefficient is replaced with its predicted value only if the original AC coefficient is zero. Also, the new coefficients are clamped to stay within the quantization interval centered on zero. FIG. 3 illustrates this processing. This approach reduces only some of the AC artifacts.

The method 300 illustrated in FIG. 3 begins in step 310 wherein JPEG compressed encoded image data 330, e.g., blocks of entropy encoded quantized DCT coefficients, begins to be processed. In step 312 entropy decoding is performed on the JPEG compressed encoded image data 330 to yield 8×8 blocks of quantized DCT coefficients including both AC and DC DCT coefficients. The blocks of AC coefficients are then processed beginning with step 313.

In step 313 a determination is made if there are more blocks of AC coefficients to be processed. If, in step 313 it is determined there are no more blocks to be processed, then processing ends in step 328. If, in step 313 it is determined there are more blocks to be processed, then processing continues with step 314 wherein the next block to be processed, hereafter called the current block, is obtained. From step 314 operation proceeds to step 316 wherein a determination is made if there are more coefficients in the current block to be processed.

Step 316 determines there are no more AC coefficients in the block to be processed if all the coefficients of the block have been processed or, in some embodiments, if a preselected number of coefficients, e.g., the first five AC coefficients in zigzag scan order, have already been processed. If, in step 316 it is determined that there are no additional AC coefficients in the current block to be processed, then processing of the current block stops and operation proceeds from step 316 back to step 313. However, if in step 316 it is determined that there are additional AC coefficients in the current block to be processed, then processing continues with step 318 wherein the next AC coefficient to be processed is obtained. Operation proceeds to step 320 wherein the AC coefficient is examined to determine if it is zero. If the retrieved AC coefficient is nonzero, operation proceeds from step 320 back to step 316 resulting in nonzero valued AC coefficients being left unaltered.

If in step 320 it was determined that the AC coefficient to be processed has a value of zero, operation proceeds to step 322 wherein a predicted AC coefficient value is computed from DC coefficients. Then, in step 324 the predicted AC coefficient value is clamped to a quantization interval centered on zero. Next, in step 326, the AC coefficient value being processed is replaced in the block of coefficients being processed with the clamped value produced in step 324. Operation proceeds from step 326 to step 316 with all of the AC coefficients to be processed in each block ultimately being subjected to the described processing.

Another noteworthy approach in the prior art involves replacing the typically used inverse DCT with the inverse DCT-1 and using the output from the inverse DCT-1 to reconstruct the image. This approach is described in the paper by S. A. Martucci, "A new approach for reducing blockiness in DCT image coders", *Proceedings of* 1998 IEEE ICASSP. For each 8×8 block of the image, an additional row and column of zeros is appended to the block to increase the size of the block to 9×9. Then an inverse 9×9 DCT-1 is applied to generate a block of 9×9 pixels. The first and last rows are each scaled by the factor $\sqrt{2}$. Then, the first and last columns are scaled by the factor $\sqrt{2}$. The output image is assembled by overlapping by one row and one column each 9×9 block with its neighbors. The values at the overlaps are combined by averaging. The final output image is reduced to correct size by deleting either the top or bottom row of the image and the first or last column of the image. FIG. 4 illustrates this processing.

The method 400 shown in FIG. 4 begins in step 410 wherein JPEG-compressed encoded image data 430, e.g., blocks of entropy encoded quantized DCT coefficients begins to be processed. In step 412 entropy decoding and dequantization is performed on the JPEG compressed encoded image data 430 to yield 8×8 blocks of dequantized DCT coefficients. Next, in step 414 each block is increased in size to 9×9 by appending a row and a column of zeros.

In step 416 an inverse 9×9 DCT-1 is applied to each block of augmented DCT coefficients to generate a corresponding 9×9 block of image data. The first and last row of each 9×9 block of image data is scaled by the factor $\sqrt{2}$ in step 418 and then the first and last column of each resulting block is scaled by the factor $\sqrt{2}$ in step 420. In step 422 an image is reconstructed by overlapping each of the scaled blocks by one row or one column with each of its four neighbors. Values that overlap are replaced by the average of the overlapping values.

Because the image that results from assembling blocks of size 9×9 in an overlapping fashion where the overlapping is by one row or one column results in a reconstructed image that is one row and one column larger than would have been reconstructed by assembling the corresponding original 8×8 blocks in nonoverlapping fashion, the larger reconstructed image must be truncated by one row and one column to generate an output image of the correct size. In step 424 either the top or bottom row of the larger reconstructed image is deleted and then either the first or last column is deleted. Processing ends in step 426 with a reconstructed image ready for display or further processing.

A side effect of the known method of DCT-1 processing shown in FIG. 4 is a one-half sample shift in each dimension of each component of the image. The reconstructed image will not be the same as the original before compression but a fractionally shifted version of it. Whether or not this shift is a problem is dependent on the application. Further processing of the reconstructed image will be affected by the shift.

Despite the usefulness of the known image processing techniques there remains a need for new and improved methods of processing images to reduce or eliminate coding artifacts including, e.g., image blockiness.

SUMMARY OF THE INVENTION

The present invention is directed to block-based image processing methods and apparatus to provide an effective and efficient reduction in block-transform image coding artifacts, especially those caused by high levels of compression. The invention can be used to improve the quality of an image encoded in a single scan or to improve each scan of a progressively encoded image. The methods of the invention can be applied to any or all components, e.g., R, G, B, and/or luminance and chrominance components, of an image having multiple components, e.g., on an individual component basis.

In various embodiments, the invention is directly incorporated into a decoding process. In such embodiments, transform coefficients are modified in simple but particularly effective ways that reduce or eliminate many of the artifacts that were caused by the quantization of the transform coefficients during encoding and/or by independent block processing. In such embodiments the invention is effective because it operates on transform coefficients and thereby addresses the artifacts where they are created. It is efficient because it operates, e.g., as part of the decoder, adding little additional complexity and avoiding the need for post-processing after decoding that could otherwise add delay before the image would be ready for display and/or further processing.

In other embodiments, the invention is used on an image that has already been decoded. This could be done as a post-processing step directly after decoding. Alternatively, such embodiments of the invention can be used to improve the quality of stored images that had been decoded earlier but exhibit objectionable artifacts that now need to be reduced or removed. In such embodiments the method of the invention either directly modifies image data values in a block-based fashion or a forward block transform is applied and then the methods of the first group of embodiments for transform coefficient blocks are followed. The resulting blocks of processed transform coefficients may be subjected to an inverse transform operation to generate a set of pixel values, e.g., uncoded image values, representing the processed image.

One method of the invention involves filtering corresponding AC coefficients in adjacent transform coefficient blocks, confining the filtered values to certain intervals, and then conditionally replacing the AC coefficients with these filtered values to generate an updated, e.g., processed, block of coefficient values.

Another inventive method is to effect pixel modifications specifically intended to force the pixel values at the block boundaries to become closer in agreement with adjacent pixels of neighboring blocks thereby reducing the magnitude of block discontinuities and thereby reducing or eliminating annoying blockiness artifacts. The pixel modifications are accomplished efficiently and effectively by manipulation of transform coefficients of the blocks. The altered pixels have the property that they trend to common values at block boundaries. This can significantly reduce or even eliminate the visibility of artificial discontinuities at block boundaries resulting from block encoding techniques. This is achieved in such a manner that the modifications of the image generally avoid introducing new distortions and the content and fidelity of the image blocks are preserved.

Another inventive method involves processing the pixel values of an image to bring them into agreement at block boundaries, by utilizing the inverse and forward DCT-1. This new use of the DCT-1 reduces blockiness artifacts without causing the one-half sample shift side effect introduced by the above-described prior art technique of using the DCT-1 for image processing. After the DCT-1 processing, conventional DCT coefficients result that can then be further processed in the same manner as would the DCT coefficients that are recovered within a typical unmodified image decoder.

As noted above, some embodiments of the invention involve performing processing on pixel values or other data resulting from decoding a set of encoded image data. Such processing may be performed as a post-processing step, e.g., directly or at some later time following decoding. For example, the invention can be used to improve the quality of stored images represented by data that had been decoded earlier but exhibit objectionable artifacts that can be reduced or eliminated through the use of the novel methods of the present invention.

One inventive method partitions an image into nonoverlapping blocks and then modifies the pixels of each block so that the mean values of the pixels of the blocks are changed and block artifacts that resulted from block mean discontinuities are reduced or eliminated. This method involves computation of block mean values, filtering of the generated mean values, confining the filtered mean values to certain intervals to generate new mean values, and then adjusting the pixel values of at least some blocks as a function of the new mean values.

Another method of the present invention involves using a forward transform on a block-partitioned image represented as a set of, e.g., pixel values, and then using the methods of the present invention for processing images represented using blocks of transform coefficients. The processing in accordance with the present invention modifies at least some of the transform coefficients and thereby improves the image quality. The resulting transform blocks representing the image including the modified coefficients can then be inverse transformed to produce pixel values from which an improved image can be reconstructed and displayed or further processed.

In some embodiments of the present invention, processing is done on quantized transform coefficients, each quantized transform coefficient having the value of the quantization level representing the quantization interval into which the transform coefficient had fallen during the quantization process. In other embodiments, processing is done on transform coefficients that had already undergone dequantization. A dequantized transform coefficient has a value that falls within the same quantization interval in which the transform coefficient had fallen during the quantization process. All dequantized transform coefficients that correspond to the same quantization interval would have the same value. The quantization intervals could be retrieved from the encoded data stream, or set to default values, or derived mathematically from an analysis of the distribution of the quantized transform coefficients themselves.

Various additional exemplary embodiments, features, and benefits of the methods and apparatus of the present invention are set forth below in the detailed description that follows.

DETAILED DESCRIPTION

Figure 1:
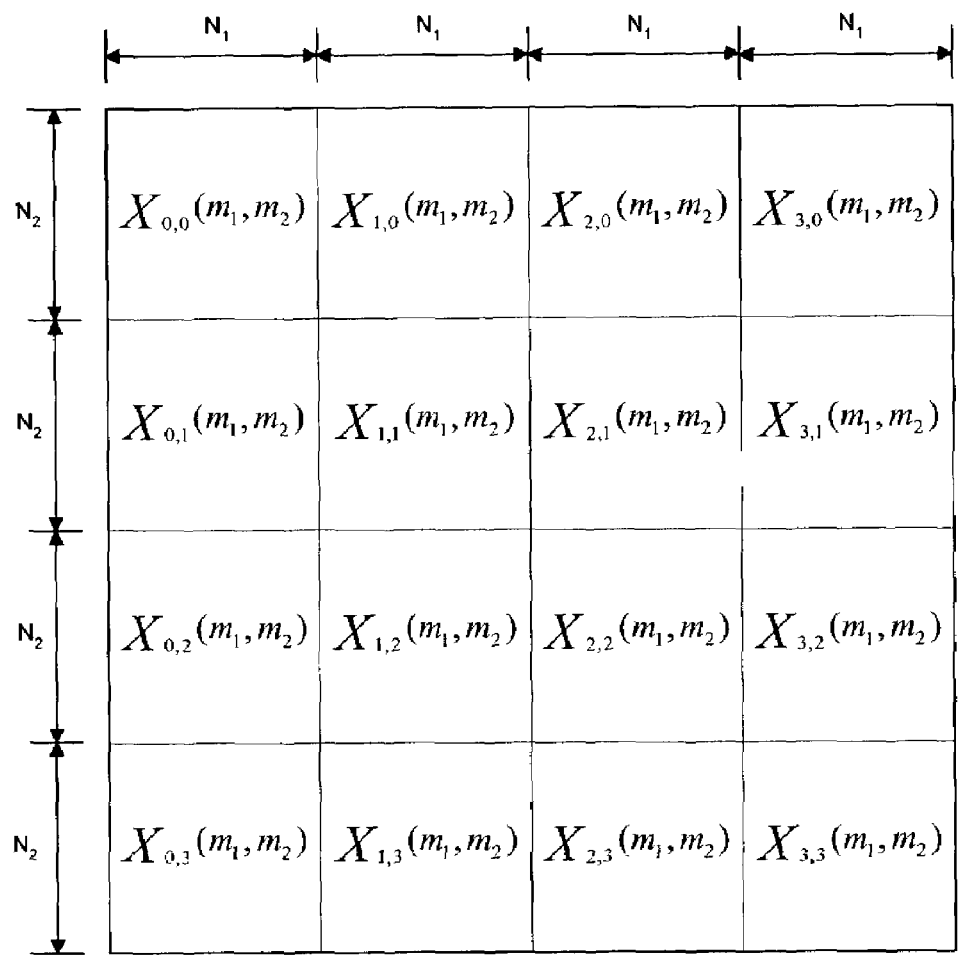
FIG. 1 illustrates partitioning of an image into a 4×4 set of blocks each of size $N_1 \times N_2$.
Figure 2:
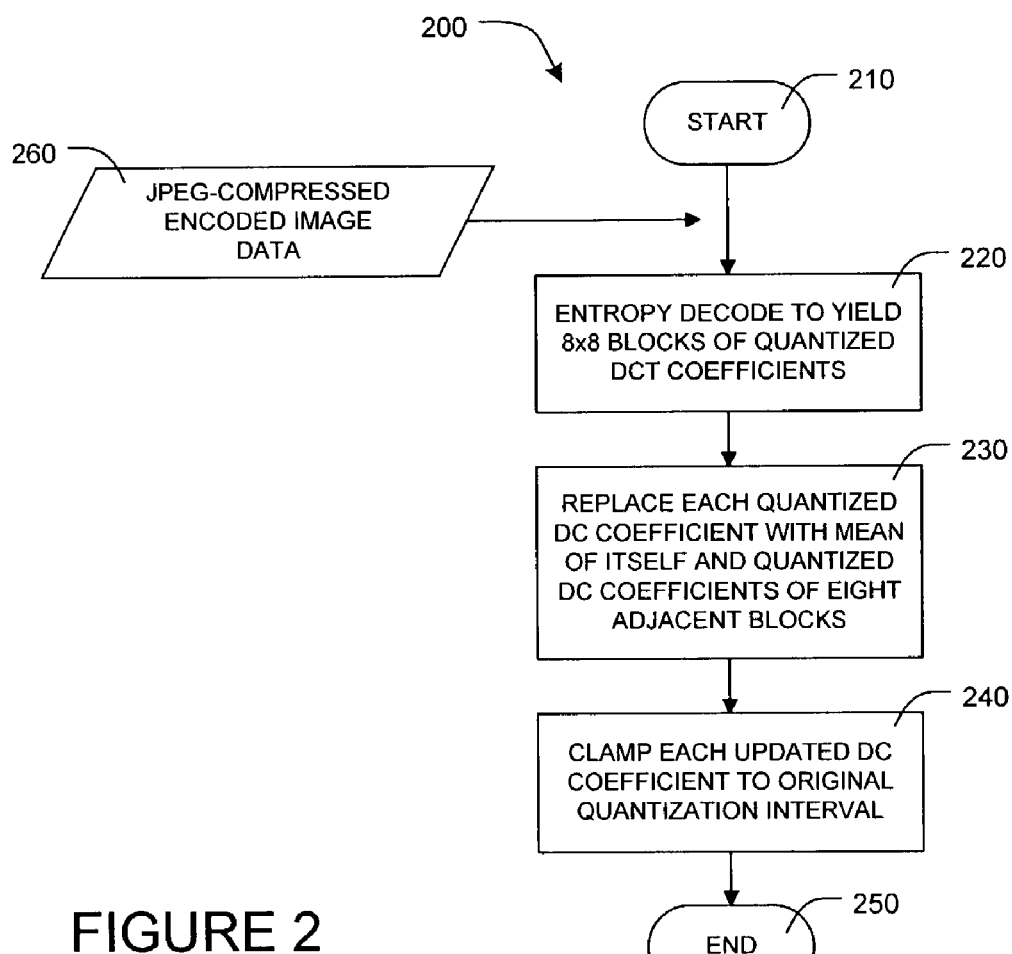
FIG. 2 illustrates a known method of processing JPEG encoded blocks of DCT coefficients that involves replacing at least some DC DCT coefficients with clamped mean values in an attempt to reduce blockiness.
Figure 3:
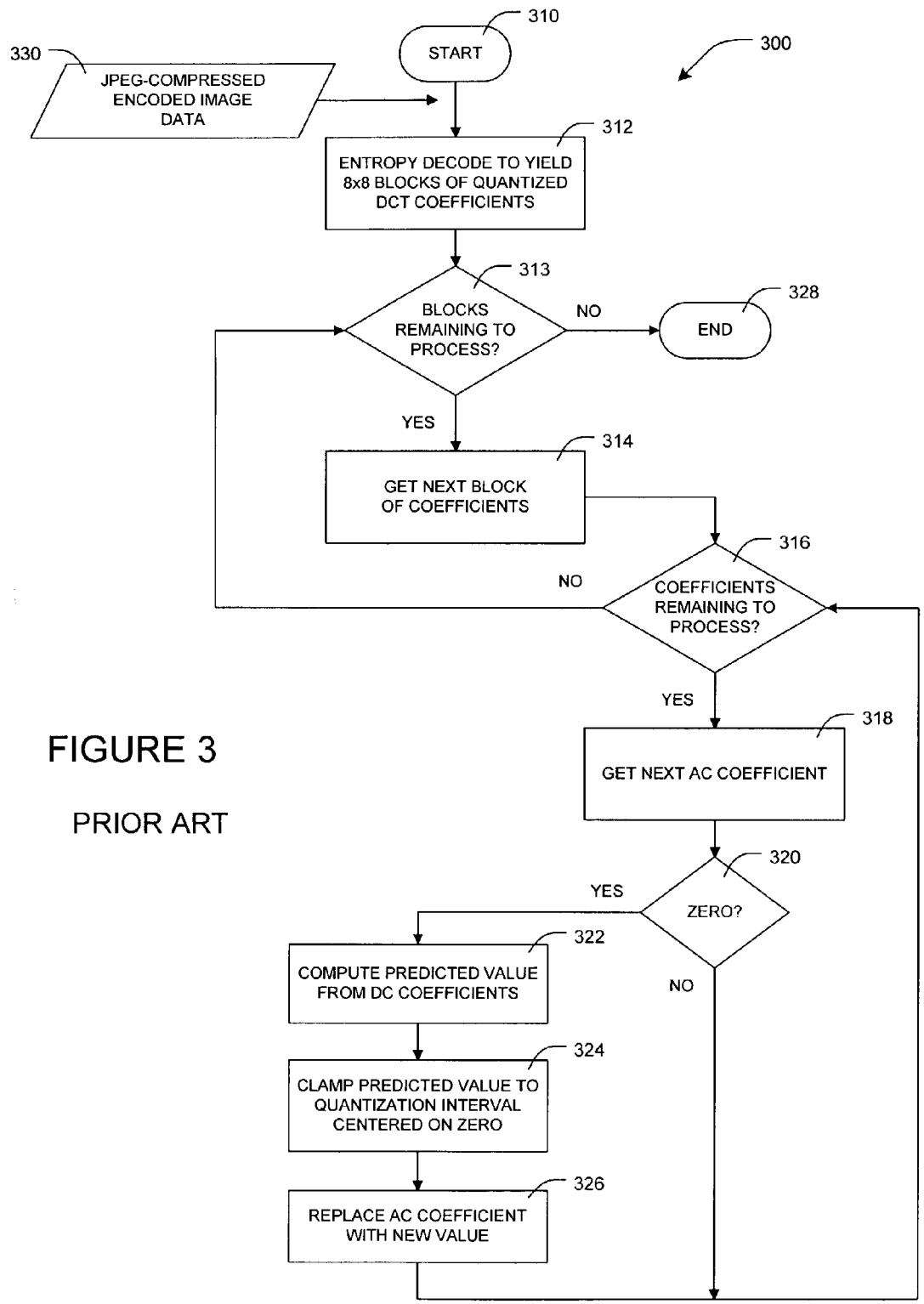
FIG. 3 illustrates a known method of processing JPEG encoded blocks of DCT coefficients that involves replacing at least some zero-valued AC DCT coefficients with clamped predicted values in an attempt to reduce blockiness.
Figure 4:
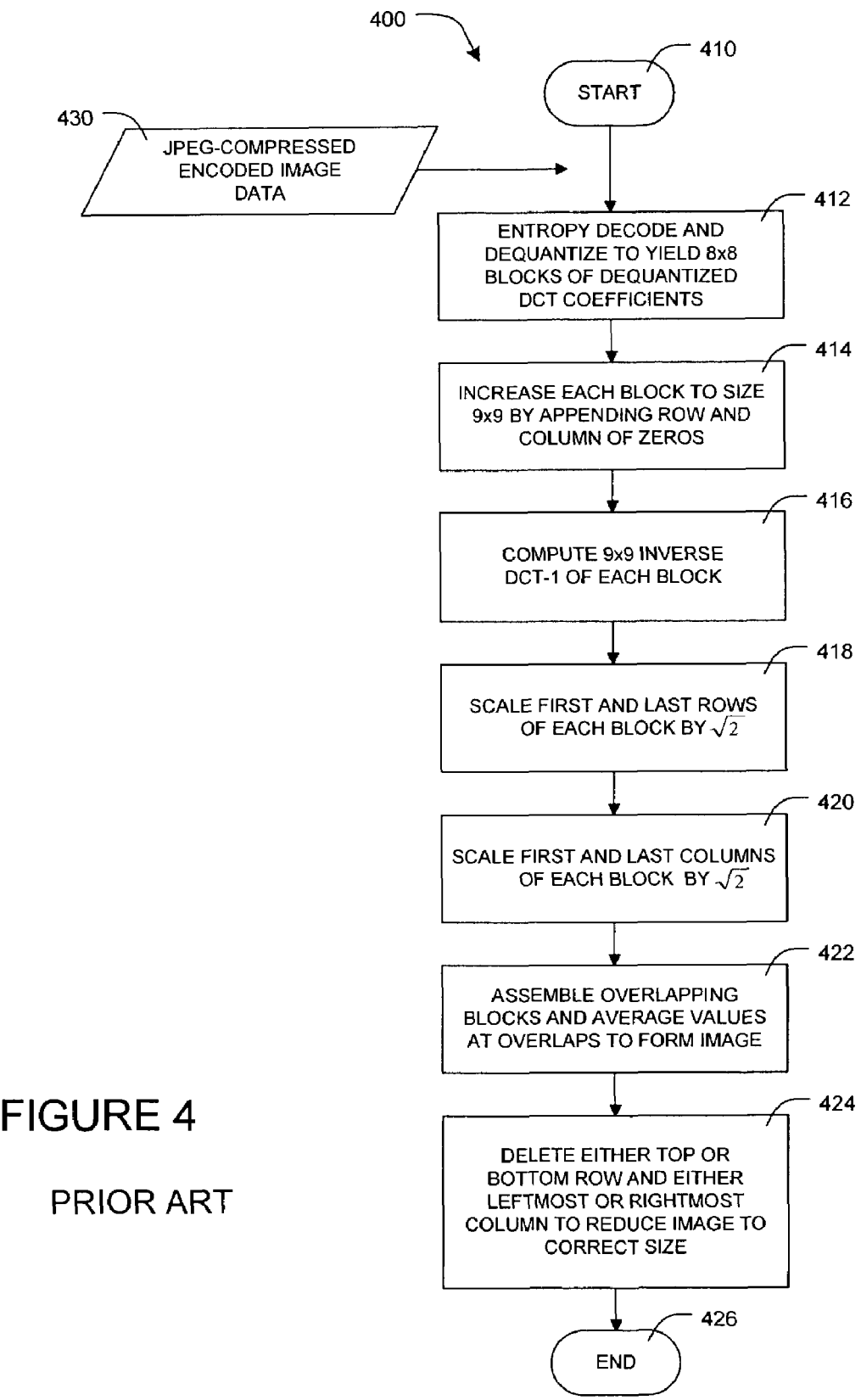
FIG. 4 illustrates a known method of processing JPEG encoded blocks of DCT coefficients that involves use of an inverse DCT-1.

FIG. 1 illustrates the partitioning of image data into nonoverlapping blocks of transform coefficients of size $N_1 \times N_2$, where the block located at offset i,j includes the transform coefficients $X_{i,j}(m_1, m_2)$, $m_1 = 0, 1, \ldots, N_1 - 1$, $m_2 = 0, 1, \ldots, N_2 - 1$. These could be DCT coefficients that resulted from the entropy decoding of a JPEG encoded image, for example, or they could have been created from the computation of a two-dimensional forward DCT applied to each corresponding block of an already decoded and reconstructed image. $N_1$ and $N_2$ may take any values, but are typically both equal to 8 for the block-DCT coding schemes. If the coefficients had been quantized, then the image reconstructed from these coefficients will contain artifacts, with the degree of artifacts directly related to the degree of quantization. The image will also exhibit artifacts resulting from the independent processing of the blocks.

One feature of the present invention is to directly improve the quality of the reconstructed image by removing or reducing the visibility of the coding artifacts. This is achieved in accordance with the invention by operating on, e.g., processing, blocks of image data, e.g., blocks of transform coefficients or blocks of pixel values. The processing can be performed either in the transform domain, e.g., by modifying the quantized or dequantized blocks of transform coefficients in various well-defined ways, or in the pixel domain, e.g., by modifying pixel values in a block-based fashion in well-defined ways on a per component basis. After the coefficients have been appropriately modified and then inverse transformed into pixel values or after the pixel values have been directly modified themselves, those pixels may be subjected to color conversion, if needed or desired, and then sent to a display. Application of the processing methods of the invention tend to reduce blockiness and thus may produce an image that will appear of higher quality than what would have resulted without the transform coefficient or direct pixel modifications made in accordance with the invention.

Various processing operations can be done individually or they can be applied in combination to provide enhanced overall visual improvement. The modifications can also be combined with other prior art methods for artifact reduction such as the DC modification scheme discussed in the background section of the application or the AC prediction scheme described in the JPEG standard.

In accordance with the present invention, one method of processing transform coefficients representing an image, involves modifying the AC coefficients of a block that satisfy some criterion to produce a modified set of coefficients representing the image. The modifications are computed as a function of the AC or DC coefficients of the current block and of one or more neighboring blocks. The method can be used on quantized or, alternatively, dequantized coefficients.

Figure 5:
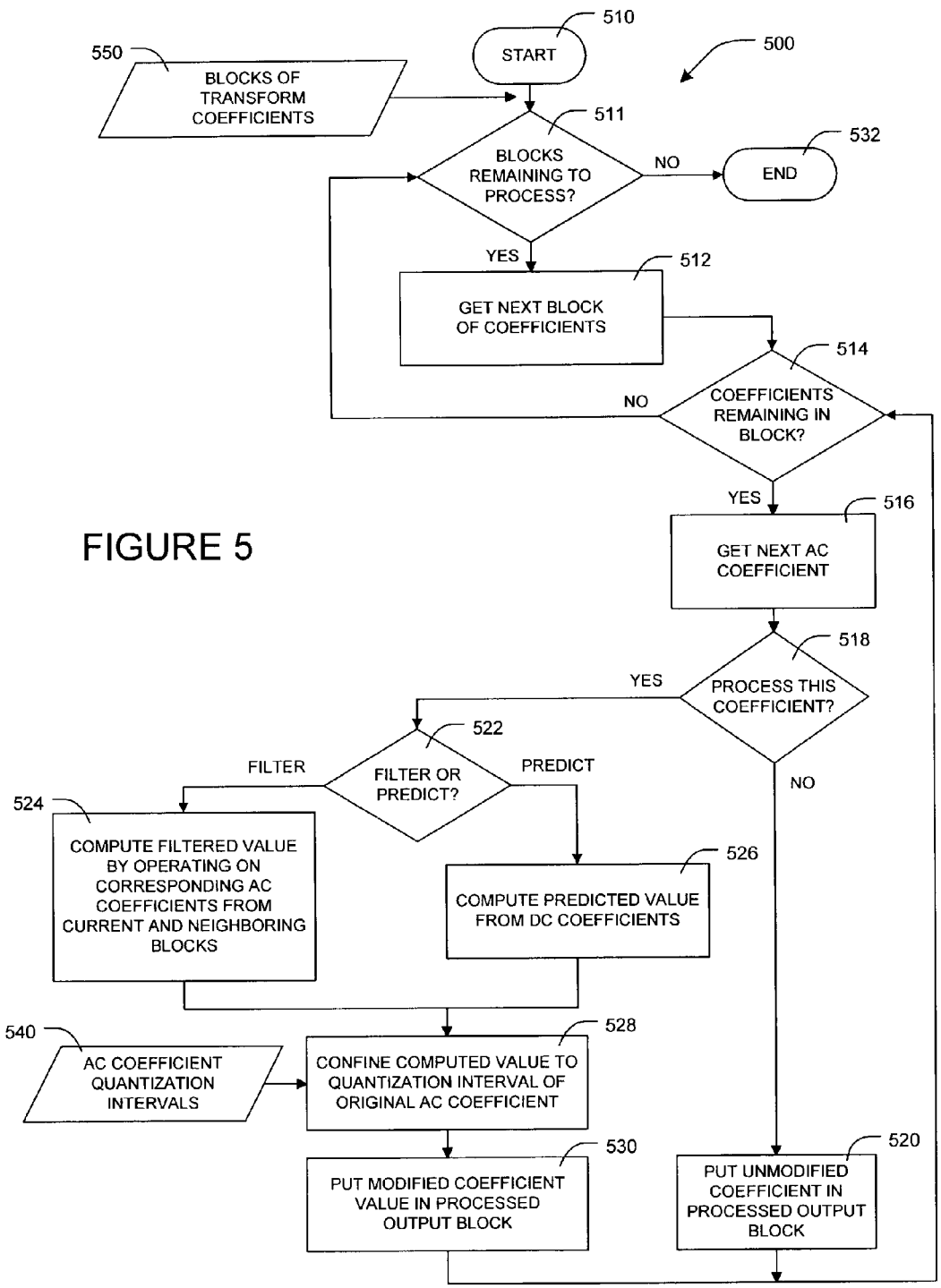
FIG. 5 illustrates an exemplary method of processing blocks of transform coefficients that involves modifying AC coefficients by filtering or prediction to reduce blockiness.

FIG. 5 depicts a particular exemplary embodiment of the method of AC coefficient modification, performed on a block-by-block basis. Processing begins in step 510. Data set 550 represents blocks of transform coefficients. Each block of transform coefficients includes a DC coefficient and one or more AC coefficients. The coefficients may assume a value of zero as may be the case for many of the AC coefficients in each block. These blocks of coefficients could have been produced by decoding of a JPEG-encoded image, for example. Or they could have been produced from applying a forward transform to each block of pixel values in an image. The coefficients may or may not have undergone dequantization.

The blocks in data set 550 are processed sequentially beginning with step 511. In step 511 a determination is made if there are more blocks in data set 550 to be processed. If there are no more blocks to be processed, processing ends in step 532. If, in step 511 it is determined there are more blocks to be processed, then processing continues with step 512 wherein the next block to be processed, hereafter called the current block, is obtained.

For each AC coefficient of the current block, the main loop of processing begins with step 514 where a determination is made as to whether or not there are coefficients remaining in the current block to be examined for processing. If there are no additional coefficients to be processed, then processing of the current block stops and operation proceeds from step 514 back to step 511 to determine if there are blocks remaining to be processed. Otherwise, processing continues with step 516 wherein the next AC coefficient to be processed, hereafter the current AC coefficient, is obtained from the current block. The current AC coefficient is then available for processing in step 518.

A test is performed in step 518 to determine if the current transform coefficient is a candidate for modification. One possible test is an examination of the value of the coefficient to see if it meets or exceeds a threshold value. Another, e.g., alternative, test involves examining the location of the coefficient within the block. Such a test is suitable where, for example, the modification processing is to be done only on coefficients at certain locations in the block. Yet another test that can be used in step 518 is to perform an examination of the block itself, to determine if a property of the current block indicates whether or not the current coefficient of that block should be further processed. Such a property may be, e.g., the location of the block within an image. In such an embodiment, processing of coefficients may be performed as a function of a block's position within an image. As a result coefficients from different blocks may be processed differently.

If the test implemented in step 518 determines that the current coefficient is not to be processed further, then operation proceeds to step 520 where the unmodified coefficient is put into the processed output block generated in accordance with the invention.

If, however, in step 518 it is determined that the current coefficient is a candidate for processing the current coefficient is further examined in step 522. Step 522 is used to determine the type of processing to be applied. Tests such as the value of the coefficient or the location of the coefficient within the block of coefficients could be used to make the determination. In the FIG. 5 example the choice of processing is between filtering the current coefficient with corresponding coefficients in neighboring blocks or predicting the coefficient from other coefficients in the current and neighboring blocks.

If, in step 522 it is determined that the current coefficient is to be subject to filtering, then operation proceeds to step 524. In step 524 a filtered value is computed using as input to a filter the current AC coefficient being processed and corresponding AC coefficients in neighboring blocks. One particular exemplary embodiment is to filter only nonzero coefficients using a filter that forms the sum of the AC coefficients located at corresponding locations in the eight neighboring blocks and in the current block itself and weights each coefficient by the number of blocks contributing to the sum, e.g., ⅑, as they are summed. As an equation, for the coefficient $X_{i,j}(m_1,m_2)$ of the block at offset i,j, steps 522 and 524 would compute the filtered coefficient $\hat{X}_{i,j}(m_1,m_2)$ according to:

$$\text{if } X_{i,j}(m_1, m_2) \neq 0,$$

$$\text{then } \hat{X}_{i,j}(m_1, m_2) = \frac{1}{9} \sum_{k=-1}^{1} \sum_{l=-1}^{1} X_{i+k,j+l}(m_1, m_2)$$

If step 522 chooses prediction, then step 526 computes a prediction for the current AC coefficient being processed using the values of the other coefficients of the current block and the neighboring blocks. One particular exemplary embodiment is for the prediction of the current AC coefficient to be made as a function of the DC coefficients of the current block and the eight neighboring blocks.

If the processing in steps 524 or 526 requires access to values beyond the boundaries of the image, then those values can be obtained using any of the methods known in the art for handling processing at image boundaries. For example, values requested beyond the first or last rows or columns of the image could be filled using the values of the blocks of the first or last rows or columns of the image, as appropriate. Another method could be to ignore the missing values and adjust the weights applied to the remaining values.

After a new value is computed for the AC coefficient, in step 528 further processing is performed on the new value to confine it to the same quantization interval in which the original AC coefficient falls. The quantization intervals are defined by the quantization matrix $Q_{i,j}(m_1,m_2)$ whose values can be obtained directly from the encoded data stream or can be derived mathematically from an analysis of the distribution of coefficient values over the whole image. Typically, the quantization matrix would not be needed when the AC coefficient is a quantized value, because in that case the quantization intervals could all be equal to one. Values defining the quantization intervals are input to step 528 from block 540.

In the exemplary embodiment, step 528 confines values by clamping those values that exceed the limits of the quantization interval to the nearest end value of the interval. For example, clamping a filtered coefficient $\dot{X}_{i,j}(m_1,m_2)$ to yield a modified coefficient $\ddot{X}_{i,j}(m_1,m_2)$ can be performed using the original coefficient $X_{i,j}(m_1,m_2)$ and the quantization matrix $Q_{i,j}(m_1,m_2)$ for the block at offset i,j according to:

$$\ddot{X}_{i,j}(m_1,m_2)=f(\dot{X}_{i,j}(m_1,m_2)-X_{i,j}(m_1,m_2))+X_{i,j}(m_1,m_2)$$

where the function $f(\bullet)$ is defined by:

$$f(\bullet)=\min(\max(\bullet,-Q_{i,j}(m_1,m_2)/2),+Q_{i,j}(m_1,m_2)/2)$$

and where the functions min and max return the minimum and maximum of their arguments, respectively. When operating on quantized coefficients, the $Q_{i,j}(m_1,m_2)$ in the above equation could all be set to the value one.

Last, step 530 puts the modified coefficient value into the processed output block, and the processing continues with the next AC coefficient. Processing is complete when all AC coefficients of all blocks have been examined and the processed output blocks are ready for further processing.

Another method of the present invention for reducing compression artifacts is to modify all transform coefficients in such a way that the blocks of pixels reconstructed from these modified transform coefficients will have values at their block boundaries nearer in agreement with their neighbors than would have been the case without the modifications. In such an embodiment, pixel values are altered in a way that significantly decreases the visibility of annoying blockiness at block boundaries while preserving the content and sharpness of the original blocks.

Figure 6:
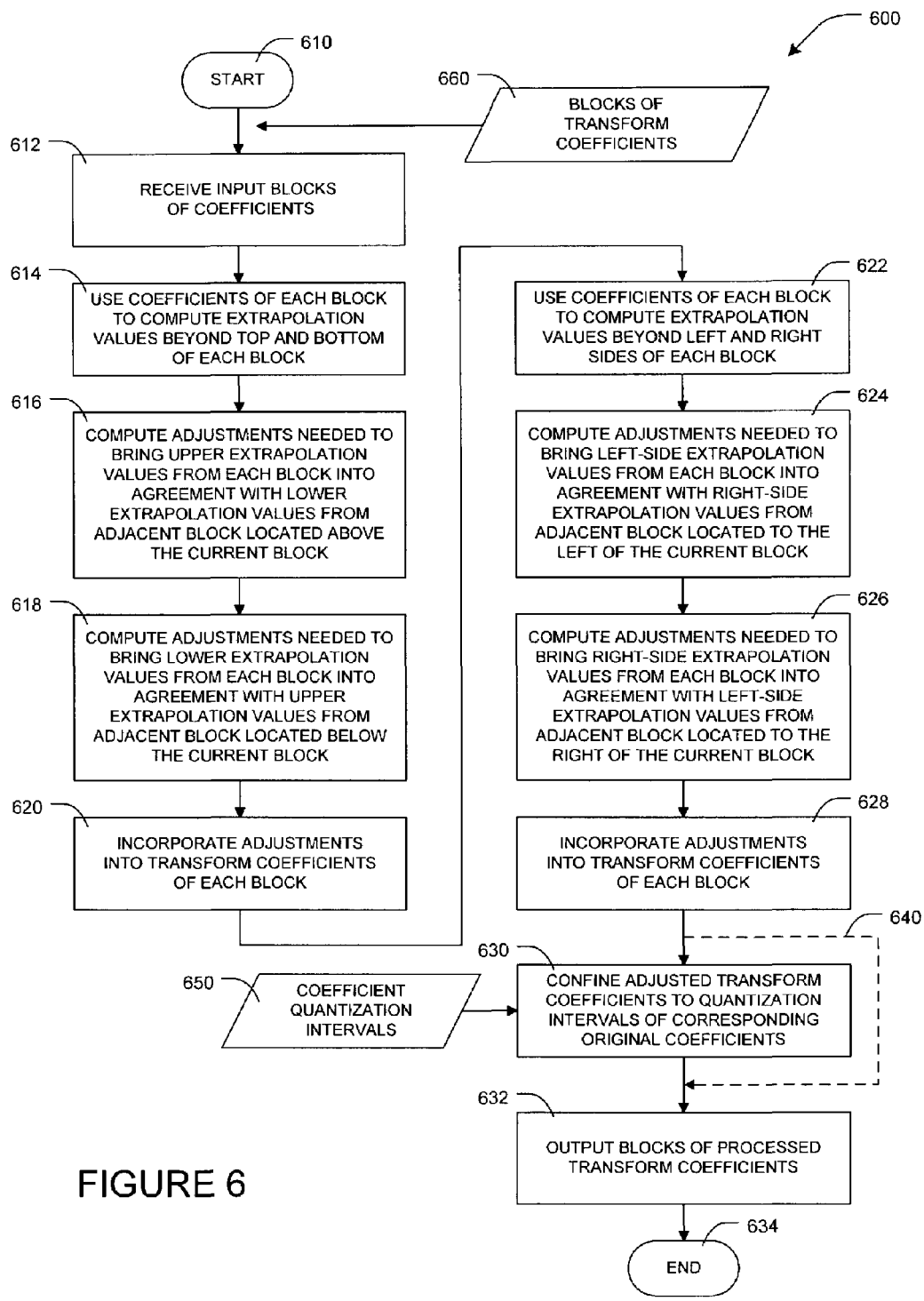
FIG. 6 illustrates an exemplary method of adjusting transform coefficient values to effect pixel modifications that reduce pixel differences at block boundaries in an attempt to reduce blockiness.

FIG. 6 depicts a particular exemplary embodiment of the method of modifying all transform coefficients to effect pixel agreement at block boundaries. Processing begins in step 610. Block 660 represents blocks of transform coefficients. These coefficients could have been produced, e.g., by decoding a JPEG-encoded image. Alternatively, they could have been produced from applying a forward transform to each block of an image, e.g., an image resulting from an earlier decoding operation.

Step 612 receives as input blocks of coefficients. Step 614 uses the coefficients of each block to compute data, e.g., values, representing extrapolation of pixel values for each block in the neighborhood of, e.g., beyond, the top and bottom pixel rows of what would have been the reconstructed image block had the entire block been inverse transformed. The extrapolation values can represent pixel values and/or interpixel values, i.e., they can align with pixel locations or be located at intermediate locations between pixels. For a given block, the extrapolation values computed for the top of the block represent the same region of the image as the extrapolation values computed for the bottom of a second block located adjacent to and above the given block. Because these pixels represent the same region of the image, if they differ significantly, block boundary artifacts will be clearly visible. The artifacts can be removed by adjusting the pixels to bring them into agreement in accordance with the invention.

Step 616 computes for each block the adjustments needed to bring the values extrapolated into the region above a given block into agreement with values extrapolated into that same region from the adjacent block located above that given block. Step 618 computes for each block the adjustments needed to bring the values extrapolated into the region below the given block into agreement with values extrapolated into that same region from the adjacent block located below that given block.

In step 620 the adjustments for each block are carried back into the transform domain where transform coefficients for a block, e.g., all the transform coefficients of the block, are appropriately adjusted using the computed adjustments for the block. The consequence of this type of modification of transform coefficients is a change to all pixels of the image block reconstructed from these modified transform coefficients that preserves the content and fidelity of the image within the block but forces the pixel values to trend towards common values at the boundaries with the neighboring blocks. As a result of the processing there are no longer block boundary differences to cause noticeable block boundary artifacts.

Steps 622–628 perform processing similar to steps 614–620, respectively, with the differences being that the input to step 622 is the output from step 620 and steps 622–628 deal with values extrapolated into regions to the left and right of each block and then adjust the transform coefficients appropriately to incorporate these left-side and right-side adjustments.

In steps 614–628, for those cases where a block does not have an adjacent neighbor, e.g., along the boundaries of the image, no adjustment needs to be done for the block boundary that lacks an adjacent neighbor.

After all transform coefficients have been appropriately adjusted, in step 630 further processing is performed on each of the adjusted coefficients to confine the adjusted coefficient to the same quantization interval as the original coefficient that is replaced with an adjusted coefficient. The quantization intervals are defined by the quantization matrix $Q_{i,j}(m_1, m_2)$ whose values can be obtained directly from the encoded data stream or can be derived mathematically from an analysis of the distribution of coefficient values over the whole image. Values defining the coefficient quantization intervals are input to step 630 from block 650.

It is not always necessary that the confining of values to quantization intervals be done. In that case, step 630 can be bypassed as indicated by the optional path 640 shown through the use of dashed lines in FIG. 6.

Step 632 completes the processing by outputting blocks of processed transform coefficients. These coefficients are valid transform coefficients representing the image. They are available for further processing and/or storage.

Although the foregoing describes a method of operating first on the columns of the blocks followed by operating on the rows of the blocks, it is to be understood that the order of processing can be reversed with the rows processed first followed by processing of the columns. It is also possible to operate on the columns and rows independent of one another instead of sequentially. For example, step 622 could take as input the blocks of original coefficients from step 612 instead of the processed coefficients from step 620. In such a case, both row and column processing would be done on original coefficients. The adjustments generated by this row and column processing are then both incorporated into the transform coefficients of each block. The results are likely to differ from the sequential processing. However, the independent processing approach may have advantages such as lower complexity and reduced latency.

Figure 7:
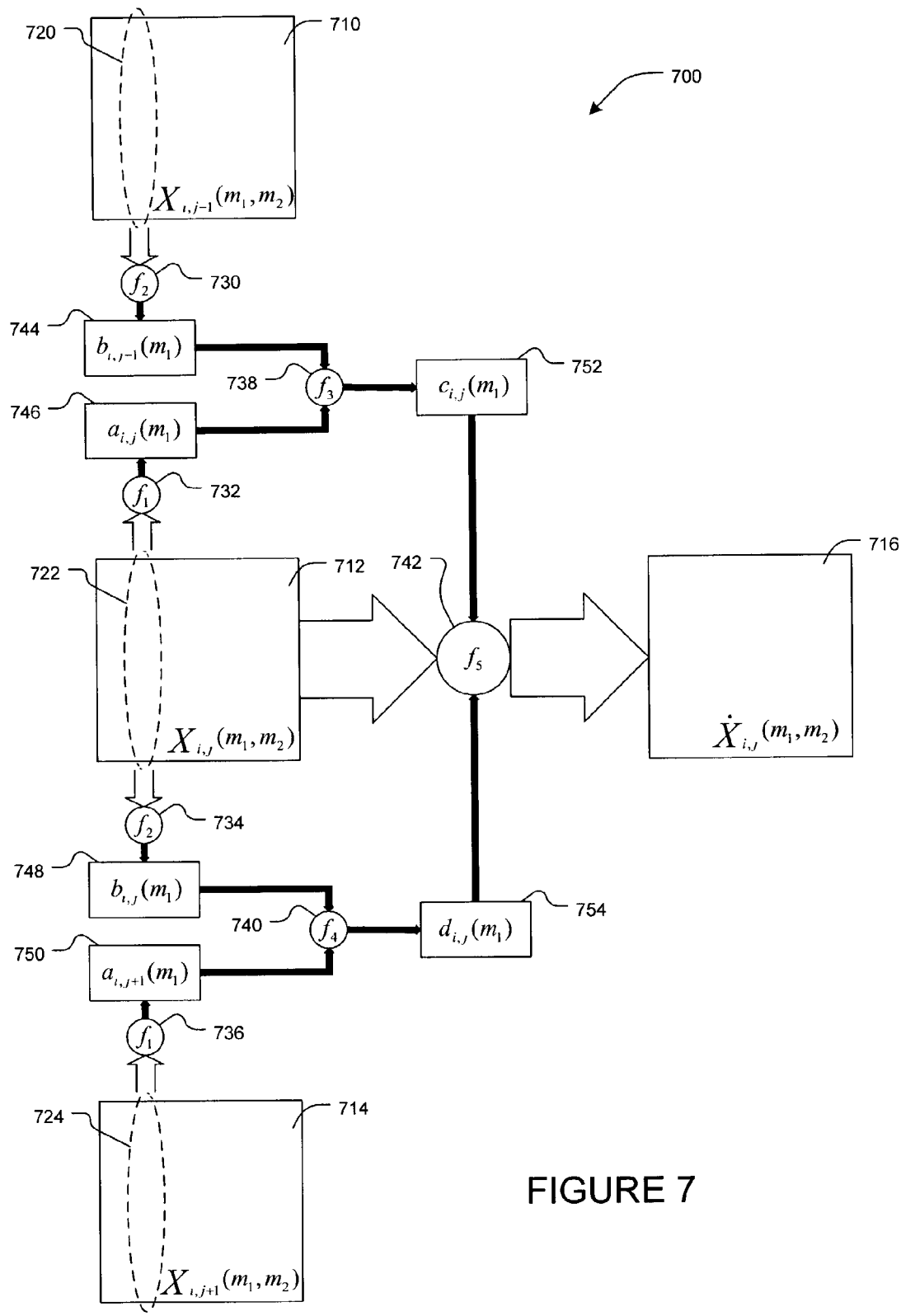
FIG. 7 depicts a circuit suitable for implementing the exemplary method of FIG. 6.

FIG. 7 shows a circuit 700 including modules for implementing various functions and for performing various processing steps in accordance with the invention.

FIG. 7 provides more detail of some of the processing of one block according to a particular exemplary embodiment of the method depicted in FIG. 6. In FIG. 7, block 712 represents a current block of DCT coefficients to be processed. Block 712 includes DCT coefficients $X_{i,j}(m_1,m_2)$, where $m_1=0, 1, \ldots, N_1-1$, $m_2=0, 1, \ldots, N_2-1$, representing block i,j of the image. Coefficient block 710 includes DCT coefficients $X_{i,j-1}(m_1,m_2)$ representing the image block located above and adjacent to the image block represented by coefficient block 712. Block 714 contains DCT coefficients $X_{i,j+1}(m_1,m_2)$ representing the image block located below and adjacent to the image block represented by coefficient block 712.

A column of coefficients 722 in coefficient block 712 is input to the function module $f_1$ 732. Module 732 computes the upper extrapolation value $a_{i,j}(m_1)=f_1(X_{i,j}(m_1,m_2))$ for the image line, e.g., column represented by column 722 of coefficient block 712. The extrapolation value is saved in storage element 746. The column of coefficients 722 in block 712 is also input to the function module $f_2$ 734. Module 734 computes the lower extrapolation value $b_{i,j}(m_1)=f_2(X_{i,j}(m_1,m_2))$ for the column represented by column 722 of coefficient block 712. The lower extrapolation value is saved in storage element 748.

The corresponding column of coefficients 720 in coefficient block 710, representing the image portion located above and adjacent to the column represented by column 722 of block 712, is input to the function module $f_2$ 730. Module 730 computes the lower extrapolation value $b_{i,j-1}(m_1)=f_2(X_{i,j-1}(m_1,m_2))$ for column 720 of block 710. The extrapolation value is saved in storage element 744. The column of coefficients 724 in block 714, representing the image portion located below and adjacent to the column represented by column 722 of block 712, is input to the function module $f_1$ 736. Module 736 computes the upper extrapolation value $a_{i,j+1}(m_1)=f_1(X_{i,j+1}(m_1,m_2))$ for column 724 of block 714. The extrapolation value is saved in storage element 750.

Column 722 is an exemplary column of block 712. Similar processing is applied to all columns of block 712. Over time, the coefficients of each column of the current block 712 will be processed by functions $f_1$ and $f_2$.

Example functions, $f_1$ and $f_2$, for computing extrapolation values from DCT coefficients are respectively:

$$a_{i,j}(m_1) = \frac{1}{N_2}\sum_{m_2=0}^{N_2-1} k(m_2) X_{i,j}(m_1, m_2)$$

$$b_{i,j}(m_1) = \frac{1}{N_2}\sum_{m_2=0}^{N_2-1} k(m_2)(-1)^{m_2} X_{i,j}(m_1, m_2)$$

For the particular exemplary embodiment, the multiplier $k(\mu)$ is $1/\sqrt{2}$ when $\mu=0$, and is 1 when $\mu=1, 2, \ldots, N_2-1$ or $\mu=1, 2, \ldots, N_2-1$. Other embodiments may use other definitions for $k(\mu)$.

Extrapolation values $a_{i,j}(m_1)$ stored in element 746 and $b_{i,j-1}(m_1)$ stored in element 744 are input to the function module $f_3$ 738. Module 738 computes the adjustment values $c_{i,j}(m_1)=f_3(a_{i,j}(m_1),b_{i,j-1}(m_1))$ needed to bring the extrapolation values $a_{i,j}(m_1)$ into agreement with the extrapolation values $b_{i,j-1}(m_1)$. The computed adjustment values are saved in storage element 752.

The extrapolation values $a_{i,j+1}(m_1)$ in storage element 750 and $b_{i,j}(m_1)$ in storage element 748 are input to the function module $f_4$ 740. The module 740 computes the adjustment values $d_{i,j}(m_1)=f_4(a_{i,j+1}(m_1),b_{i,j}(m_1))$ needed to bring the extrapolation values $b_{i,j}(m_1)$ into agreement with the extrapolation values $a_{i,j+1}(m_1)$. The adjustment values are saved in storage element 754.

Example functions, $f_3$ and $f_4$, for computing adjustments are:

$$c_{i,j}(m_1) = \frac{1}{2}(b_{i,j-1}(m_1) - a_{i,j}(m_1))$$

$$d_{i,j}(m_1) = \frac{1}{2}(a_{i,j+1}(m_1) - b_{i,j}(m_1))$$

Next, the adjustment values $c_{i,j}(m_1)$ in storage element 752 and $d_{i,j}(m_1)$ in storage element 754 and the DCT coefficients $X_{i,j}(m_1,m_2)$ in block 712 are input to the function module $f_5$ 742. Module 742 computes the adjusted DCT coefficients $\dot{X}_{i,j}(m_1,m_2)=f_5(X_{i,j}(m_1,m_2),c_{i,j}(m_1),d_{i,j}(m_1))$ that are then saved in storage element 716.

An example function $f_5$ for incorporating adjustments into DCT coefficients is:

$$\dot{X}_{i,j}(m_1,m_2)=X_{i,j}(m_1,m_2)+k(m_2)(c_{i,j}(m_1)+(-1)^{m_2}d_{i,j}(m_1))$$

For the particular exemplary embodiment, the multiplier $k(\mu)$ is $1/\sqrt{2}$ when $\mu=0$, and is 1 when $\mu=1, 2, \ldots, N_1-1$ or $\mu=1, 2, \ldots, N_2-1$. Other embodiments may use other definitions for $k(\mu)$.

Another way that the present invention modifies DCT coefficients of a block in order to alter pixel values so that they agree with the pixel values of the neighboring blocks makes use of a two-dimensional DCT to process and modify the DCT coefficients. The DCT can be a DCT-2 or a DCT-1.

Figure 8:
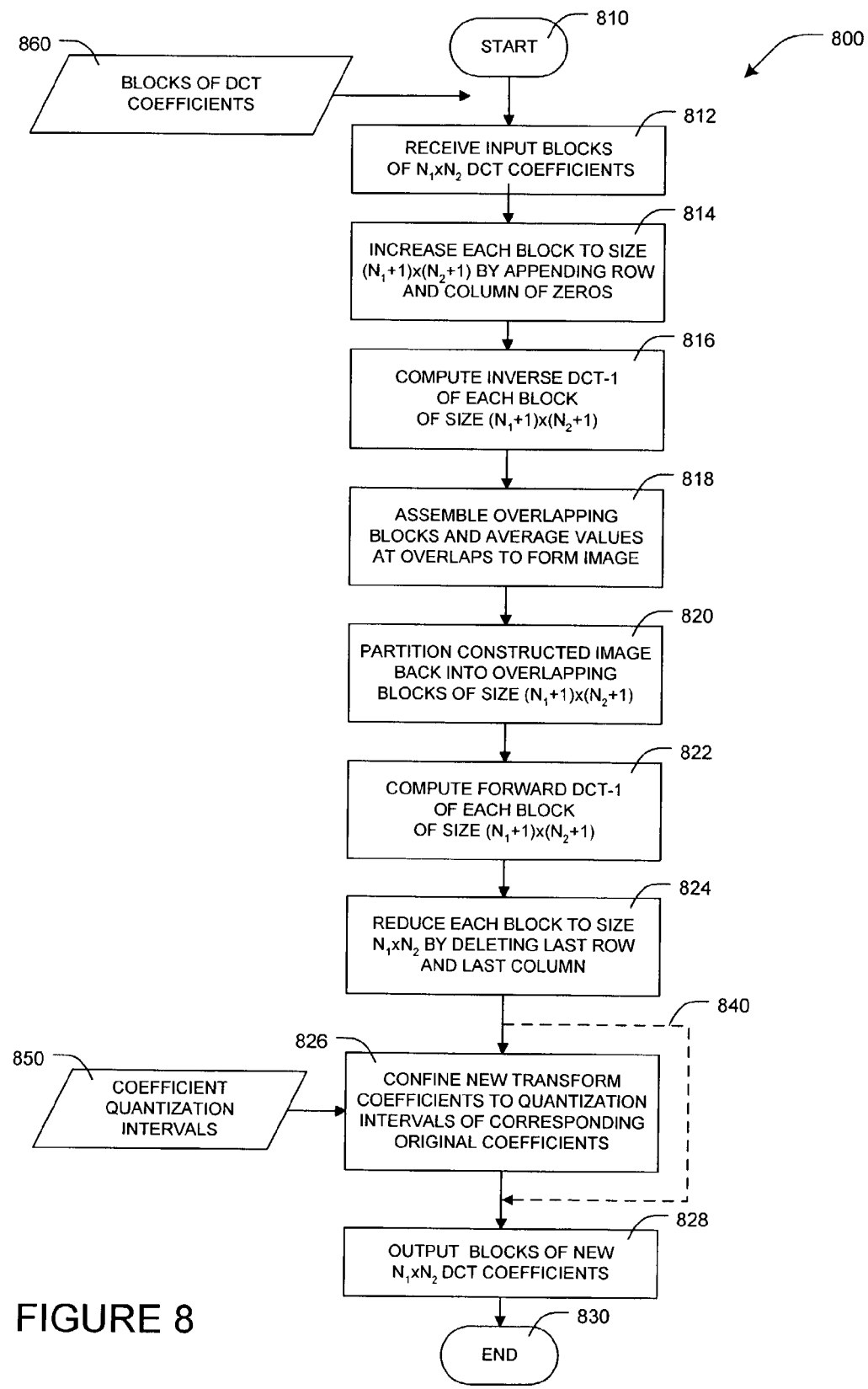
FIG. 8 illustrates an exemplary method of processing blocks of DCT coefficients that involves use of an inverse DCT-1 followed by a forward DCT-1 to yield modified DCT coefficients.

FIG. 8 depicts a particular exemplary embodiment of the method using the DCT-1. Processing begins in step 810. Block 860 represents blocks of DCT coefficients. These coefficients could have been produced, e.g., while decoding a JPEG-encoded image, for example. Or they could have been produced from applying a forward transform to each block of an image.

Step 812 receives as input blocks of DCT coefficients of size $N_1 \times N_2$. In step 814 each block is increased to size $(N_1+1)\times(N_2+1)$ by appending an additional row and an additional column of values. The exemplary embodiment uses the value zero for each value in the appended row and column. Step 816 computes the inverse two-dimensional DCT-1 of each block of size $(N_1+1)\times(N_2+1)$.

Figure 9:
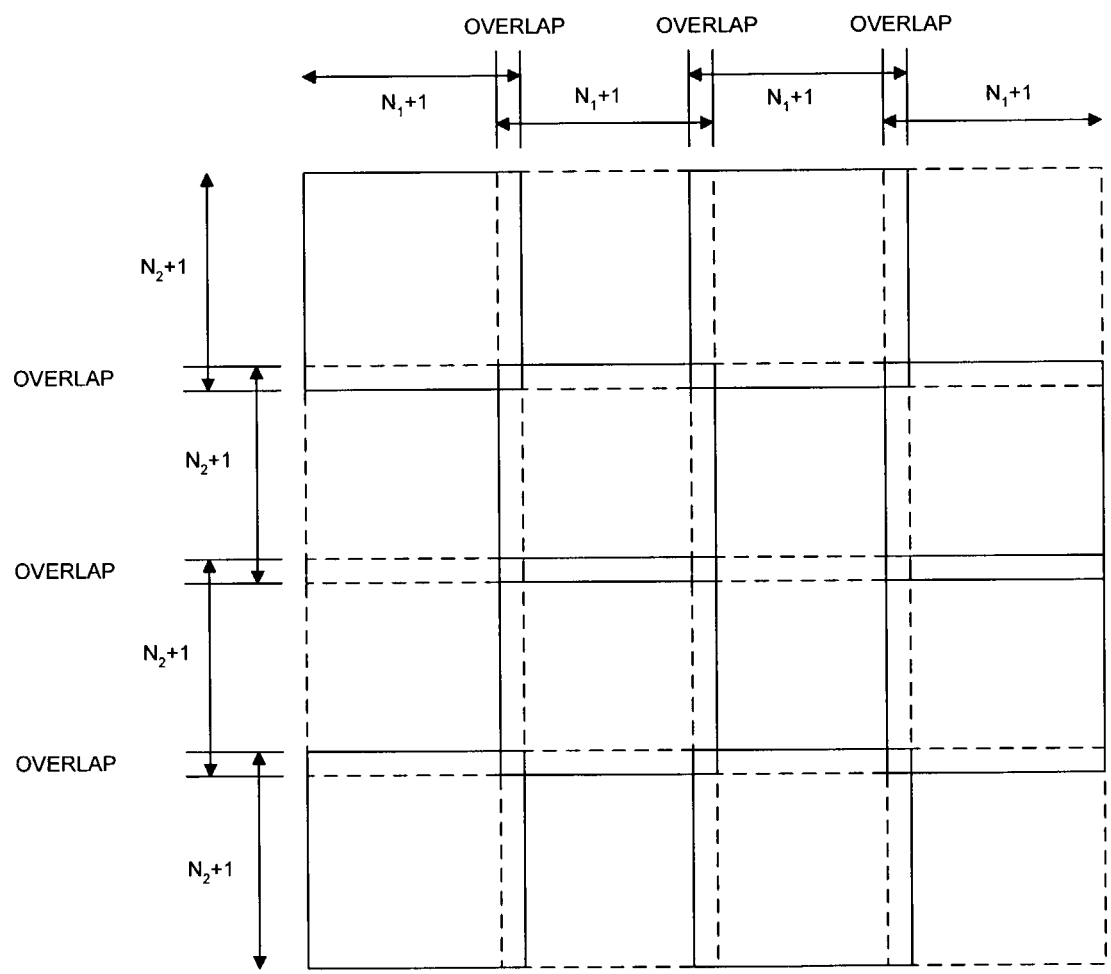
FIG. 9 illustrates partitioning of an image into a 4×4 set of overlapping blocks each of size $(N_1+1) \times (N_2+1)$.

The outputs from the inverse DCT-1 of all the blocks are assembled in step 818 into a whole image by overlapping each block with each of its neighbors by one row or one column, as appropriate. FIG. 9 illustrates the assemblage of overlapping blocks. In the regions of overlap, the values from the two blocks that coincide are combined together to create a new value at that position. At the four corners of each block there will be values from four blocks that need to be combined. The combination of values may be, e.g., an averaging of values. Thus, the exemplary embodiment replaces the overlapping values with the average of the overlapping values.

In step 820 the constructed image, with overlapping values properly combined, is partitioned back into overlapping blocks of size $(N_1+1)\times(N_2+1)$, where each block overlaps its neighbors by one row or one column as shown in FIG. 9. These overlapping blocks align with the blocks that were overlapped in step 818.

Step 822 computes the forward two-dimensional DCT-1 of each block of size $(N_1+1) \times (N_2+1)$. In step 824 each of the resulting blocks of coefficients is then reduced in size to $N_1 \times N_2$. This is done in the exemplary embodiment by deleting the last row and last column of the block. Each block is now a block of adjusted DCT coefficients of size $N_1 \times N_2$ that corresponds to a block of original DCT coefficients that had been input to step 812.

In step 826 further processing is performed on the blocks of adjusted DCT coefficients to confine the coefficients to the same quantization intervals in which the original corresponding coefficients fall. The quantization intervals are defined by the quantization matrix $Q_{i,j}(m_1,m_2)$ whose values can be obtained directly from the encoded data stream or can be derived mathematically from an analysis of the distribution of coefficient values over the whole image. Values defining the coefficient quantization intervals are input to step 826 from block 850.

It is not always necessary that the confining of values to quantization intervals be done. In that case, step 826 can be bypassed as indicated by the optional path 840 shown in FIG. 8 through the use of dashed lines.

Step 828 completes the processing by outputting blocks of processed DCT coefficients. These coefficients are valid DCT coefficients representing the image ready for any further processing or display.

As an alternative to steps 820–824, a forward two-dimensional DCT of size $N_1 \times N_2$ instead of the DCT-1 can be used. In this case, the constructed image would be partitioned into nonoverlapping blocks of size $N_1 \times N_2$, the first or last rows of all blocks scaled by the factor $\sqrt{2}$ and then the first or last columns of all blocks scaled by the factor $\sqrt{2}$ (or the columns scaled first and then the rows scaled), and then the DCT applied. The DCT coefficients created can then be used for any further processing.

Figure 10:
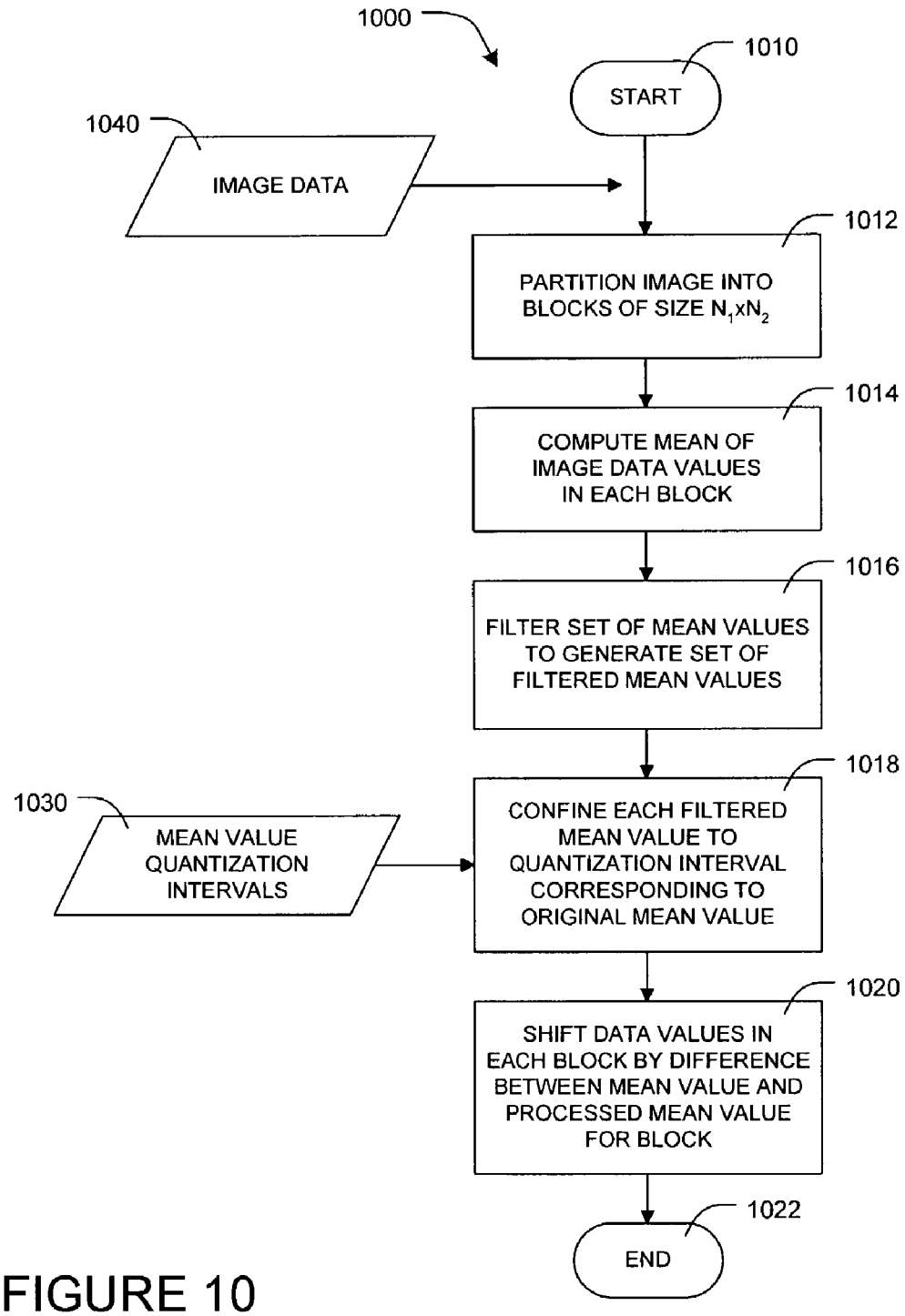
FIG. 10 illustrates an exemplary method of processing blocks of image data that involves modification of block mean values in an attempt to reduce blockiness.

In accordance with the present invention, one method of block-wise pixel modification to improve the quality of an already reconstructed image is to partition an image into blocks of pixel values and modify the mean values of each block as a function of the mean values of the neighboring blocks. FIG. 10 depicts a particular exemplary embodiment of the method of mean filtering performed on a per pixel value component basis, e.g., R, G and B pixel values would each be subject to independent processing by the method illustrated in FIG. 10. Processing begins in step 1010. Data set 1040 is the image data that serves as input to step 1012. Data set 1040 includes pixel values that represent an image. In step 1012, the image data 1040 is partitioned into contiguous nonoverlapping blocks of pixel values of size $N_1 \times N_2$. In step 1014 the mean of each block is computed creating a set of mean values, one per block.

In step 1016 a filter is applied to the set of mean values to generate a set of filtered mean values, one per block. An example filter used in the exemplary embodiment is the mean filter of size 3×3 centered on the value whose filtered value is being generated. For each mean value the filtered value is computed as the weighted sum of itself and the means of the eight neighboring blocks where the weight is the number of blocks contributing to the sum, i.e., ⅑ for this filter.

If the processing in step 1016 requires access to mean values beyond the boundaries of the image, then those values can be obtained using any of the methods known in the art for handling processing at data boundaries. For example, values requested beyond the first or last rows or columns of the set of mean values would be filled using the values of the first or last rows or columns of the set, as appropriate. Another method would be to ignore the missing values and adjust the weights applied to the remaining values.

In step 1018 further processing is done to confine each filtered mean value to a quantization interval corresponding to the original mean of the block. A quantization interval for the mean value of an image block is a derived quantity found by examining the distribution of mean values of all blocks of the image and analyzing the data to determine if the values fall into discrete levels and what those levels are. From these levels a quantization interval for each mean value can be inferred. Values defining these quantization intervals are input to step 1018 from block 1030. In the exemplary embodiment step 1018 confines values by clamping those values that exceed the limits of the quantization interval to the nearest end value of the interval.

Step 1020 uses the filtered and confined mean value for each block to adjust all pixel values of that block so that the modified block will have a mean equal to that processed mean value. This modification of pixel values can be accomplished by shifting the pixel values by an amount equal to the difference between the original mean value and the processed mean value for the block.

Various image processing methods of the present invention have been discussed in detail above. The present invention is also directed to apparatus, e.g., systems for implementing the above-described methods. It is also directed to machine-readable media, e.g., data storage devices such as CDROMs, hard disks, and other types of memory, which store machine executable instructions which, when executed, cause a machine to implement one or more of the above-described image processing methods of the present invention.

Figure 11:
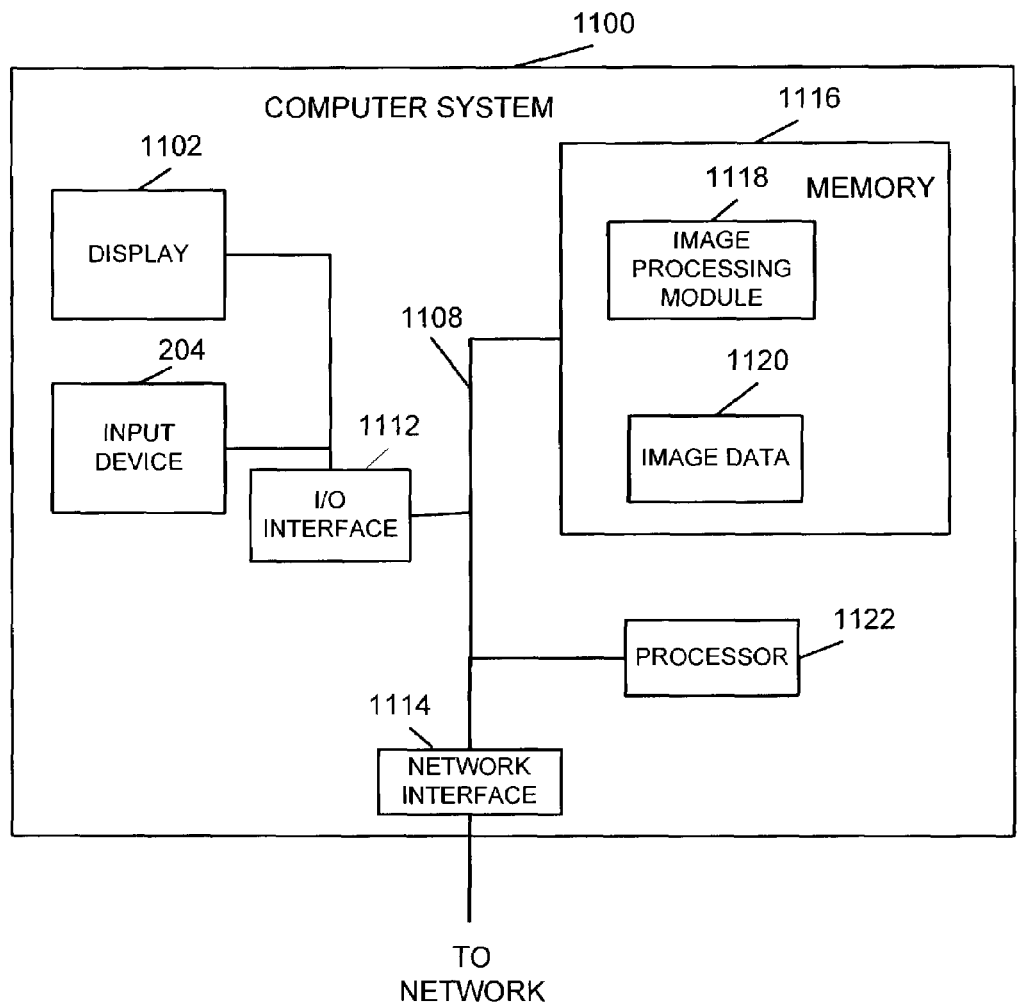
FIG. 11 illustrates a computer system including one or more modules, e.g., software routines, for processing image data in accordance with one or more methods of the present invention.

FIG. 11 illustrates a computer system 1100 for processing image data implemented in accordance with one embodiment of the present invention. The computer system 1100 includes a display device 1102, input device 1104, memory 1116, processor 1122, network interface 1114, and I/O interface 1112. The display device 1102 may be used, e.g., to display images resulting from processing implemented in accordance with the present invention. Input device 1104 may be, e.g. a keyboard or other user input device. The display and input device are coupled to a bus 1108 by I/O interface 1112. The bus 1108 is also coupled to the memory 116, processor 112 and network interface 1114. The network interface 1114 coupled the internal components of the system 1100 to an external network, e.g., the Internet, thereby allowing the system 1100 to receive and send image data over a network. The processor 1122 controls operation of the computer system 1100 under direction of software modules and/or routines stored in the memory 1116. Memory 1116 includes image data 1120 at least one image processing module 1118 which includes a software routine, e.g., machine executable instructions, for implementing one or more of the above-described image processing methods of the present invention. When executed by processor 1122, the image processing module 1118 causes at least some of the image data to be processed by the processor 1122 in accordance with a method of the present invention. The resulting processed image data is stored in memory 116 for future use or additional processing or supplied to display device 1102 to be displayed.

While the methods and apparatus of the present invention have been described using examples which involve DCT-2 and/or DCT-1 transforms and/or coefficients, it is to be understood that such implementations are exemplary in nature and that the image processing methods of the present invention are suitable for use with a wide variety of coding transforms.

In view of the above discussion, numerous variations on the methods and apparatus of the present invention will be apparent to those skilled in the art. Such variations are to be considered within the scope of the invention.

What is claimed is:

1. A method of processing transform coefficient blocks, each transform coefficient block representing a different image block, comprising the steps of:
generating first values corresponding to a first region from transform coefficient values included in a first transform coefficient block, the first region being positioned along a first edge of a first image block represented by said first transform coefficient block;
generating second values corresponding to said first region from transform coefficient values included in a transform coefficient block representing a second image block adjacent to said first edge; and
calculating a first set of adjustments required to modify said first values to conform to a first set of common values, said first set of common values being a function of said first and second sets of values.

2. The method of claim 1, further comprising:
modifying transform coefficients in said first transform coefficient block as a function of said first set of adjustment values.

3. The method of claim 2, wherein generating first values includes computing first data values representing a neighborhood of an edge of said first image block, each of said first data values being computed from an array of transform coefficients of the first block, said array of coefficients of the first block corresponding to a first line of image values to which said first data values also correspond.

4. The method of claim 3, wherein generating second values includes computing second data values representing a neighborhood of an edge of said second image block, each second data value being computed from an array of transform coefficients of the second block, said array of coefficients corresponding to a second line of image values of the second image block to which said second data values also correspond.

5. The method of claim 2, further comprising:
prior to performing said modifying, generating third values corresponding to a second region from transform coefficient values included in said first transform coefficient block, the second region being positioned along a second edge of said first image block located opposite the first edge;
generating fourth values corresponding to said second region from transform coefficient values included in a transform coefficient block representing a third image block adjacent to said second edge;
calculating a second set of adjustments required to modify said third values to conform to a second set of common values, said second set of common values being a function of said third and fourth sets of values; and
wherein said step of modifying is performed as a function of said first and second sets of adjustment values.

6. The method of claim 5, further comprising:
generating fifth values corresponding to a third region from transform coefficient values included in said modified first transform coefficient block, the third region being positioned along a third edge of said first image block;
generating sixth values corresponding to said third region from transform coefficient values included in a modified transform coefficient block representing a fourth image block adjacent to said third edge;
calculating a third set of adjustments required to modify said fifth values to conform to a third set of common values, said third set of common values being a function of said fifth and sixth sets of values; and
modifying transform coefficients in said modified first transform coefficient block as a function of said third set of adjustment values.

7. The method of claim 6, further comprising:
prior to performing said modifying of said modified first transform coefficient block, generating seventh values corresponding to a fourth region from transform coefficient values included in said modified first transform coefficient block, the fourth region being positioned along a fourth edge of said first image block located opposite the third edge;
generating eighth values corresponding to said fourth region from transform coefficient values included in a modified transform coefficient block representing a fifth image block adjacent to said fourth edge;
calculating a fourth set of adjustments required to modify said seventh values to conform to a fourth set of common values, said forth set of common values being a function of said seventh and eighth sets of values; and
wherein said step of modifying transform coefficients in said modified first transform coefficient block is performed as a function of said third and fourth sets of adjustment values.

8. The method of claim 5, further comprising:
prior to performing said modifying, generating fifth values corresponding to a third region from transform coefficient values included in said first transform coefficient block, the third region being positioned along a third edge of said first image block;
generating sixth values corresponding to said third region from transform coefficient values included in a transform coefficient block representing a fourth image block adjacent to said third edge;
calculating a third set of adjustments required to modify said fifth values to conform to a third set of common values, said third set of common values being a function of said fifth and sixth sets of values; and
wherein said step of modifying is performed as a function of said first, second and third sets of adjustment values.

9. The method of claim 8, further comprising:
prior to performing said modifying, generating seventh values corresponding to a fourth region from transform coefficient values included in said first transform coefficient block, the fourth region being positioned along a fourth edge of said first image block located opposite the third edge;
generating eighth values corresponding to said fourth region from transform coefficient values included in a transform coefficient block representing a fifth image block adjacent to said fourth edge;
calculating a fourth set of adjustments required to modify said seventh values to conform to a fourth set of common values, said forth set of common values being a function of said seventh and eighth sets of values; and
wherein said step of modifying is performed as a function of said first, second, third and fourth sets of adjustment values.

10. The method of claim 2, wherein said step of modifying transform coefficients in said first transform coefficient block includes confining at least one modified transform coefficient to a quantization interval corresponding to a coefficient in said first transform coefficient block from which said at least one modified transform coefficient was produced.

11. The method of claim 1, wherein said common values are the means of the corresponding values in said first and second values.

12. The method of claim 1, wherein calculating adjustments includes calculating the differences between said first values and the corresponding values in said set of common values.

13. A machine-readable medium comprising a set of computer executable instructions for controlling a processor to perform the steps recited in claim 1.

14. The method of claim 1, wherein said transform coefficient blocks are generated by performing a forward transform on each of a plurality of image blocks of a decoded image.

15. An apparatus for processing transform coefficient blocks, each transform coefficient block representing a different image block, the apparatus comprising:

means for generating first values corresponding to a first region from transform coefficient values included in a first transform coefficient block, the first region being positioned along a first edge of a first image block represented by said first transform coefficient block; and means for generating second values corresponding to said first region from transform coefficient values included in a transform coefficient block representing a second image block adjacent to said first edge; and means for calculating a first set of adjustments required to modify said first values to conform to a first set of common values, said first set of common values being a function of said first and second sets of values.

16. The apparatus of claim 15, further comprising:

means for generating third values corresponding to a second region from transform coefficient values included in said first transform coefficient block, the second region being positioned along a second edge of said first image block located opposite the first edge;

means for generating fourth values corresponding to said second region from transform coefficient values included in a transform coefficient block representing a third image block adjacent to said second edge; and means for calculating a second set of adjustments required to modify said third values to conform to a second set of common values, said second set of common values being a function of said third and fourth sets of values.

17. The apparatus of claim 16, further comprising:

means for modifying transform coefficients in said first transform coefficient block as a function of said first and second sets of adjustment values.

18. The apparatus of claim 16, wherein means for generating first values is implemented as a first function module;

wherein said means for generating second values corresponding to said first region from transform coefficient values is implemented as a second function module;

wherein said means for calculating a first set of adjustments required to modify said first values to conform to a first set of common values is implemented as a third function module; and wherein said means for modifying is implemented as another function module.

19. The apparatus of claim 15, further comprising:

means for modifying transform coefficients in said first transform coefficient block as a function of said first set of adjustment values.

* * * * *